(12) United States Patent
Nahata et al.

(10) Patent No.: US 10,992,396 B1
(45) Date of Patent: Apr. 27, 2021

(54) SYSTEMS AND METHODS FOR MAPPING RESOURCE BLOCKS TO NETWORK SLICES

(71) Applicant: Verizon Patent and Licensing Inc., Arlington, VA (US)

(72) Inventors: Hans Raj Nahata, New Providence, NJ (US); Kalyani Bogineni, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/784,859

(22) Filed: Feb. 7, 2020

(51) Int. Cl.
| | |
|---|---|
| *H04W 88/06* | (2009.01) |
| *H04B 17/336* | (2015.01) |
| *H04L 5/00* | (2006.01) |
| *H04L 12/851* | (2013.01) |
| *H04W 72/04* | (2009.01) |

(52) U.S. Cl.
CPC .......... *H04B 17/336* (2015.01); *H04L 5/001* (2013.01); *H04L 47/2441* (2013.01); *H04W 72/0453* (2013.01); *H04W 72/0493* (2013.01); *H04W 88/06* (2013.01)

(58) Field of Classification Search
CPC combination set(s) only.
See application file for complete search history.

(56) References Cited

U.S. PATENT DOCUMENTS

| | | | | |
|---|---|---|---|---|
| 2010/0157910 A1* | 6/2010 | Nentwig | ............... | H04L 5/0044 370/329 |
| 2015/0270934 A1* | 9/2015 | Roth | ..................... | H04L 5/0073 370/330 |
| 2017/0079059 A1* | 3/2017 | Li | ......................... | H04W 16/02 |
| 2017/0318468 A1* | 11/2017 | Aijaz | ..................... | H04W 16/10 |
| 2019/0132784 A1* | 5/2019 | Thubert | .............. | H04W 72/044 |
| 2019/0261157 A1* | 8/2019 | Ramle | .................. | H04W 48/18 |
| 2019/0357119 A1* | 11/2019 | Hong | .................... | H04W 48/08 |
| 2019/0363843 A1* | 11/2019 | Gordaychik | ........ | H04W 72/042 |
| 2020/0120580 A1* | 4/2020 | Jin | ........................ | H04W 48/02 |

* cited by examiner

*Primary Examiner* — Julio R Perez

(57) ABSTRACT

A RAN node may determine an aggregate signal-to-noise ratio (SNR) of each resource block of a plurality of resource blocks, where the aggregate SNR of a given resource block of the plurality of resource blocks is based on SNRs of subcarrier frequencies of the given resource block. The RAN node may determine, based on a type of network traffic on each network slice of a plurality of network slices, an index value of each network slice of the plurality of network slices. The RAN node may map, based on the aggregate SNR of each resource block, based on the index value of each network slice, and for each resource block of the plurality of resource blocks, a resource block of the plurality of resource blocks to a network slice of the plurality of network slices.

20 Claims, 9 Drawing Sheets

SYSTEMS AND METHODS FOR MAPPING RESOURCE BLOCKS TO NETWORK SLICES

BACKGROUND

Next generation wireless networks such as Fifth Generation (5G) networks, provide various enhancements to wireless communications, such as flexible bandwidth allocation, improved spectral efficiency, ultra-reliable low-latency communications (URLLC), beamforming, high-frequency communication (e.g., millimeter wave (mmWave)), and/or the like.

DETAILED DESCRIPTION OF PREFERRED EMBODIMENTS

Figure 1A:
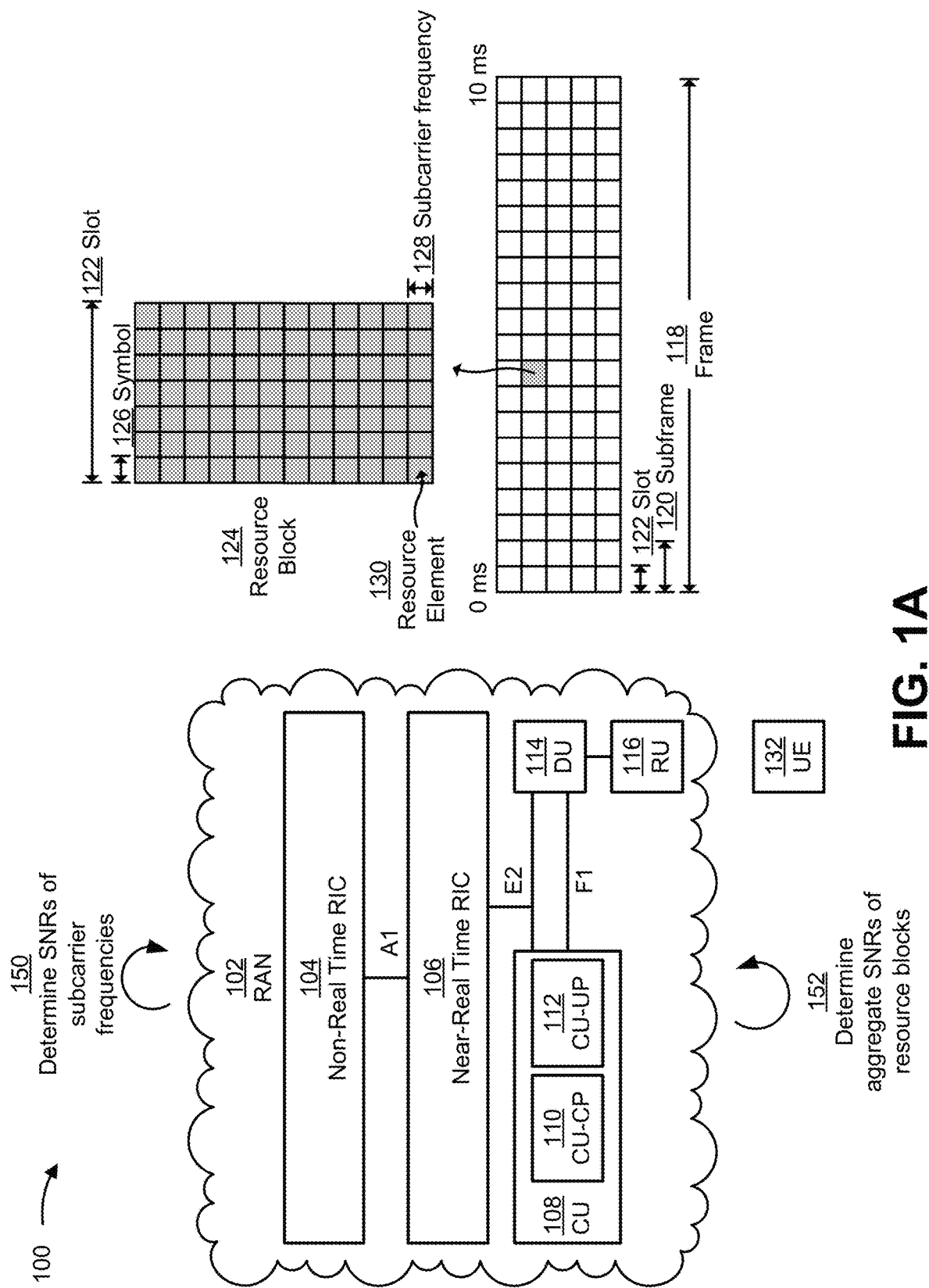
FIGS. 1A-1D are diagrams of one or more example implementations described herein.

The following detailed description of example implementations refers to the accompanying drawings. The same reference numbers in different drawings may identify the same or similar elements.

A 5G network may allow deployment of a distributed core network and a disaggregated radio access network (RAN) architecture to support diverse use cases with different service level agreements (SLAs). Support for these diverse use cases may be achieved through network slices (e.g., logical network instances customized to support the SLAs).

In a wireless telecommunications system, such as a 5G wireless telecommunications network, network slicing may allow for multiple virtual networks to run on a single physical network to support multiple services, applications, and/or entities (e.g., end users, customers, organizations that provide a service to end users of the wireless telecommunications systems, and/or the like). In some instances, when a user equipment (UE) requests a connection (e.g., protocol data unit (PDU) connectivity) to the network for an application and/or service, the UE provides the network with information associated with the UE, the application, and/or the service. Such information may include network slice selection assistance information (NSSAI), which may include a collection or list of individual, single-network slice selection assistance information (S-NSSAI) (which can be referred to herein individually as "S-NSSAI" or collectively as "S-NSSAIs"). In general, the S-NSSAI may identify respective network slices associated with the UE. In such cases, a network slice selection function (NSSF) can determine a network slice instance (NSI) (e.g., a virtual network of network functions (NFs) and other resources to support one or more S-NSSAIs) for the S-NSSAI. The NSSF may provide, to an access and mobility management function (AMF), an NSI identifier (NSI ID) associated with the NSI. Further, the AMF may provision a communication session, using the corresponding NSI, for the UE.

In general, a network slice may refer to a logical end-to-end network that may be dynamically created to serve a particular service type with an agreed-upon SLA, where a single UE may access or otherwise connect in parallel to multiple network slices that share a common AMF over a single radio interface (or air interface). Each network slice may be configured to give a very distinct customer experience (e.g., ultra-reliable (UR) services, ultra-high bandwidth (UHB), extremely low-latency, ultra-reliable low-latency communication (URLLC), and/or the like). For example, in a given scenario, a UE may be associated with a first network slice for Internet browsing, a second network slice for an augmented reality (AR) and/or virtual reality (VR) game, a third network slice for vehicle-to-everything (V2X) communication, and/or the like.

In some instances, the UE may wirelessly connect to a radio access network (RAN) via a RAN node, which is connected to a data network via a core network. As described above, when the UE requests a connection for an application and/or service, the UE provides information associated with the UE, the application, and/or the service. The RAN may provide the information associated with the UE, the application, and/or the service to the core network, and the core network may identify (e.g., using the NSSF, the AMF, and/or the like) a network slice based on the information associated with the UE, the application, and/or the service and provision a communication session on the network slice for the UE. For example, the core network may provide, to the RAN, information identifying the network slice (e.g., an NSI ID), and the RAN node may establish a connection between the UE and the core network on the network slice.

The RAN node may perform (e.g., using a RAN controller and/or the like) a variety of network functions for the RAN including assigning resource blocks (e.g., radio resource blocks, physical resource blocks, and/or the like) to network slices to which the UE may be connected. For example, the RAN node may assign resource blocks to network slices to maximize aggregate throughput for the RAN while complying with service requirements of the network slice (e.g., bandwidth, latency, and/or the like). For example, the RAN node may map the minimum number of resource blocks to a network slice to satisfy the service requirements of the network slice. However, if a signal-to-noise ratio (SNR) of resource blocks mapped to a network slice for mission critical traffic is too low, the network slice may require more retransmissions by the network, which consumes network resources. Additionally, retransmissions and/or delays in the RAN for network slices may consume resources.

Some implementations described herein may determine aggregate SNRs for resource blocks, determine index values of network slices based on a type of network traffic on the network slices, and map the resource blocks to the network slices based on the aggregate SNRs and index values. For example, a RAN node may map resource blocks having high aggregate SNRs to network slices having index values corresponding to mission critical traffic. By mapping resource blocks having high aggregate SNRs to network slices for mission critical traffic, the RAN node may reduce and/or eliminate retransmissions and/or delays for mission critical traffic.

In this way, the RAN node may conserve network resources that would otherwise be consumed by retransmissions caused by mapping resource blocks having low aggregate SNRs to a network slice even though the resource blocks may satisfy the service requirements of the network slice.

While 5G allows an architecture to support diverse use cases with different SLAs by configuring network slices based on characteristics of network traffic, the RAN node may, in some implementations, configure radio resources (e.g., the resource blocks, subcarrier frequencies, and/or the like) based on characteristics of network traffic.

FIGS. 1A-1D are diagrams of one or more example implementations 100 described herein. In particular, example implementation(s) 100 include a RAN 102, which may be a portion of a wireless telecommunications system (e.g., a wireless network), which in some implementations may be a 5G wireless telecommunications system, a fourth generation (4G) wireless telecommunications system, a long-term evolution (LTE) wireless telecommunications system, an LTE-Advanced (LTE-A) wireless telecommunications system, and/or the like.

Figure 1B:
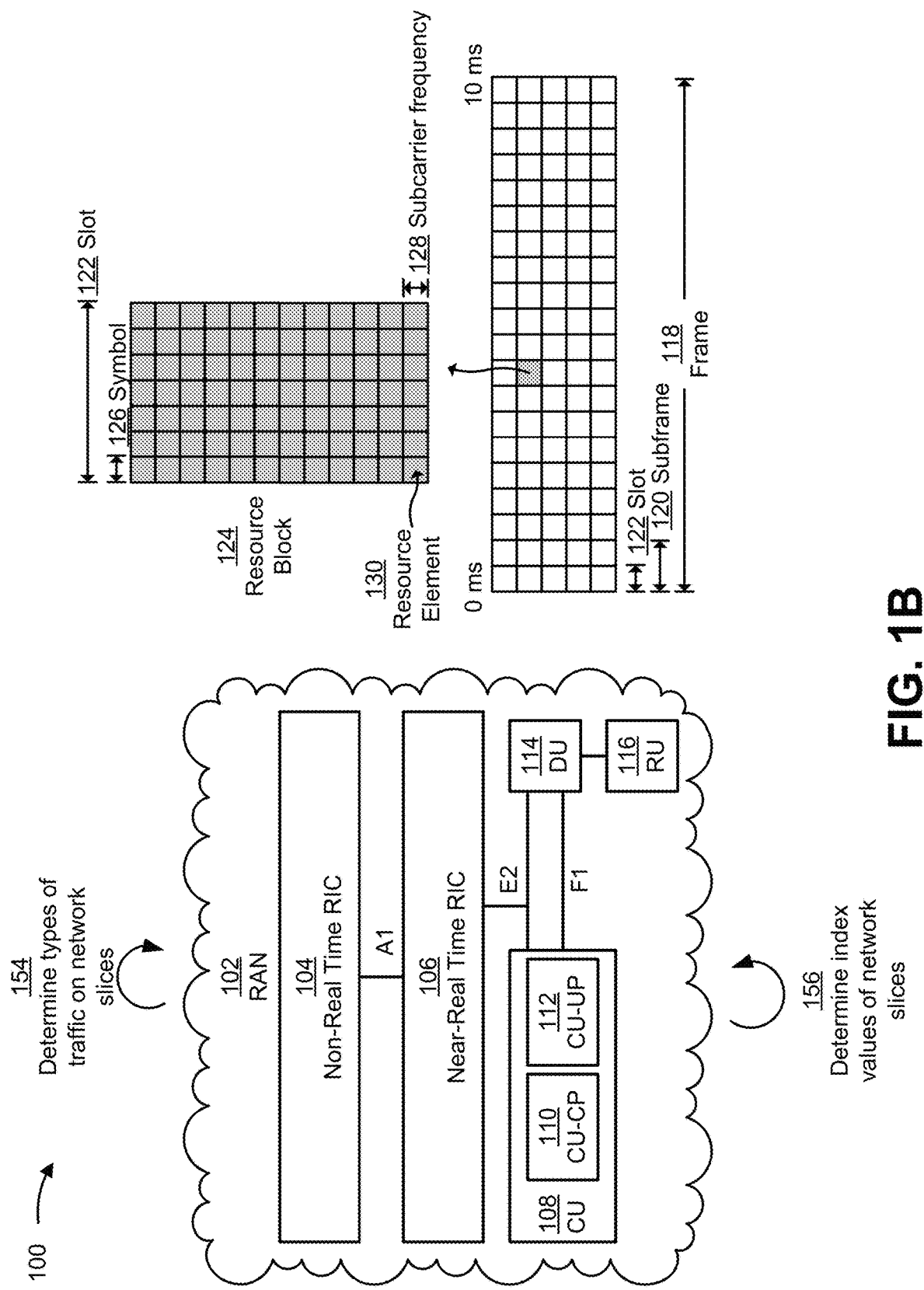
Figure 1C:
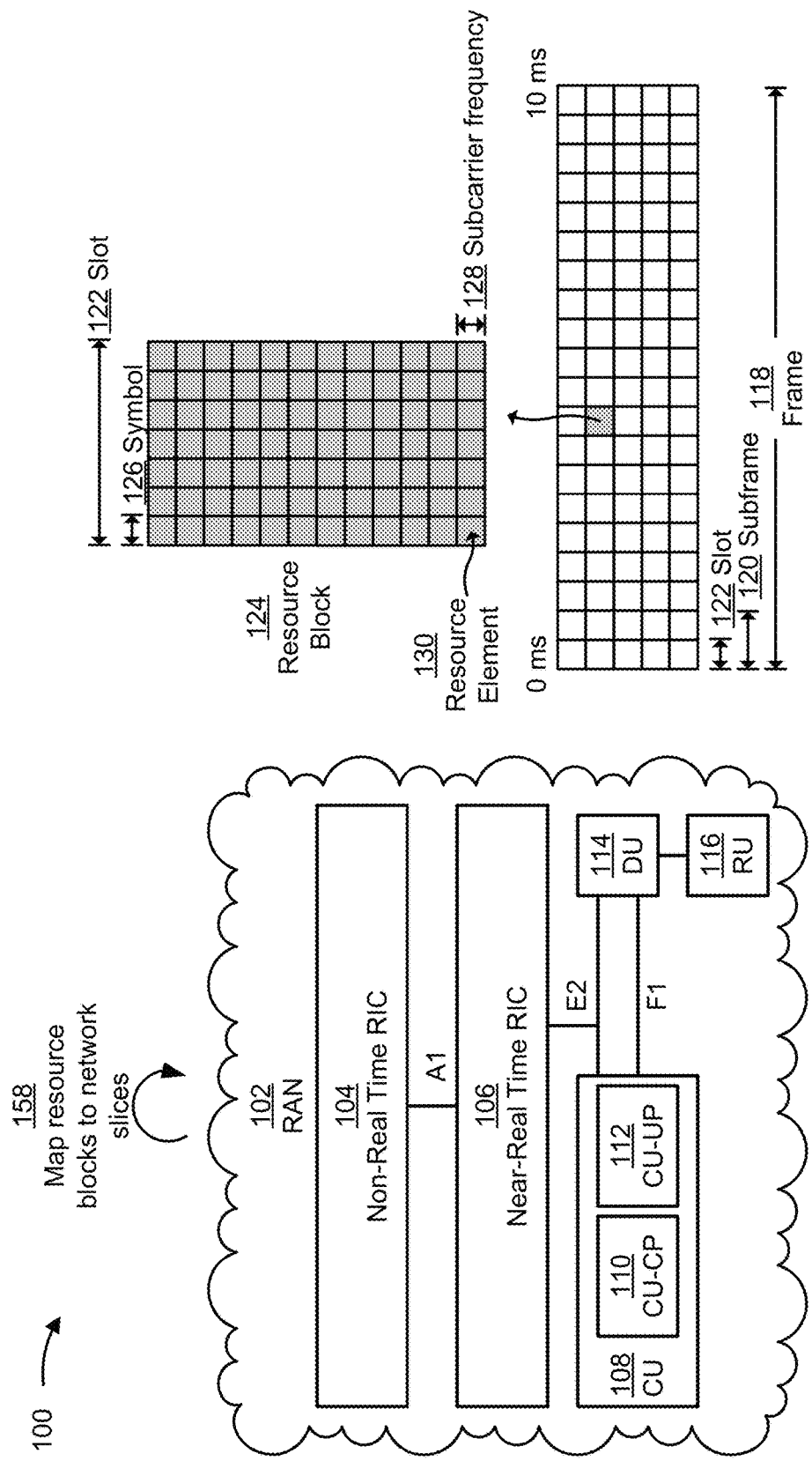

As shown in FIGS. 1A-1C, the RAN 102 may include a non-real time RAN intelligent controller (RIC) 104, a near-real time RIC 106, a central unit (CU) 108 including a CU control plane (CU-CP) 110 and a CU user data plane (CU-UP) 112, a distributed unit (DU) 114, and a radio unit (RU) 116. The RAN 102 may include one or more base stations that provide an access point to the RAN 102, such as a 5G next generation NodeB (gNodeB or gNB), an LTE evolved NodeB (eNodeB or eNB), and/or the like. In some implementations, the base station facilitates a communication session by communicating application-specific data between a UE (e.g., UE 132) and the core network. In some implementations, and as described herein, the base station may have a disaggregated or "split" architecture, including one or more distributed units (DUs) (e.g., DU 114) and one or more central units (CUs) (e.g., CU 108), where the one or more CUs may be further split into a control plane (CU-CP) node (e.g., CU-CP 110) and a user plane (CU-UP) node (e.g., CU-UP 112). In this way, by disaggregating the base station into one or more DUs and one or more CUs, the base station may be implemented with a flexible hardware design that allows scalable cost-effective solutions and coordination of load management, real time performance optimization, virtualized deployment, and adaptation to various use cases, such as variable transport latency.

As shown in FIGS. 1A-1C, the non-real time RIC 104 and the near-real time RIC 106 may communicate via an A1 interface. For example, the A1 interface may be between a network management platform (e.g., including the non-real time RIC 104) governing orchestration and automation and one or more base stations (e.g., including the near-real time RIC 106). In some implementations, the non-real time RIC 104 may be a layer that does not operate in real time (e.g., greater than about 1 second) and may perform policy management, function management (e.g., artificial-intelligence-based function management and/or the like), RAN analytics, and/or the like.

In some implementations, the near-real time RIC 106 may be another layer that operates in near-real time (e.g., operates within about 1 second or less of real time) and may perform radio network topology management, radio resource management (RRM), slice management, training module management, and/or the like. For example, the near-real time RIC 106 may perform load balancing per UE, resource block management, quality of service management, handover control, and/or the like. As shown in FIGS. 1A-1C, the near-real time RIC 106 may communicate with the CU 108 and the DU 114 via an E2 interface.

As also shown in FIGS. 1A-1C, the CU 108 may include the CU-CP 110 and the CU-UP 112. In some implementations, the CU 108 may be a multi-Radio Access Technology protocol stack supporting, for example, 4G and 5G multiple radio access. The CU 108 may support visualization and may include functions that execute commands from the non-real time RIC 104. As shown in FIGS. 1A-1C, the CU 108 may communicate with the DU 114 via an F1 interface. In some implementations, the CU 108 may support W1, E1, X2, Xn, and/or the like interfaces specified by the 3GPP.

In some implementations, the DU 114 and the RU 116 may provide real-time Layer 2 (L2) functions, baseband signal processing, and radio signal processing. The DU 114 and the RU 116 may communicate via an open fronthaul interface (e.g., a circuit between radio equipment and a baseband processor of base-station equipment, an optical fiber, and/or the like).

In some implementations, the RAN 102 may divide each frequency band available for transmission into sub-frequencies, and may use a frequency-hopping spread spectrum (FHSS) method to transmit signals by switching a carrier frequency among sub-frequencies using, for example, a pseudorandom sequence known to transmitter and receiver. For example, the RAN 102 may use a Frequency Division Duplex (FDD) topology including a frame structure as specified by a standard. As shown in FIGS. 1A-1C, the RAN 102 may use a frame structure in which each frame 118 includes ten subframes 120 and each subframe includes two slots 122.

As further shown in FIGS. 1A-1C, each slot 122 may include multiple resources blocks 124. Each resource block 124 may include symbols 126 and subcarrier frequencies 128, where each pairing of a symbol 126 to a subcarrier frequency 128 defines a resource element 130. For example, and as shown in FIGS. 1A-1C, each resource block 124 may be one slot long in time, about 180 kHz wide in frequency, and includes about twelve subcarrier frequencies 128 having a width of approximately 15 kHz. Each resource block 124 may represent a unit of resources (e.g., radio resources) that may be allocated to a user, and each resource element 130 may contain a single value representing data from a physical channel and/or signal.

As described above, the near-real time RIC 106 may perform RRM. For example, the near-real time RIC 106 may define the resource blocks 124 using the symbols 126 and the subcarrier frequencies 128. Additionally, or alternatively, the RAN 102, using the near-real time RIC 106, may map the resource blocks 124 to network slices. For example, the RAN 102 may map the resource blocks 124 to network slices by assigning symbols 126 and subcarrier frequencies 128 to a network slice.

In some implementations, before mapping the resource blocks 124 to network slices, the RAN 102 may receive a connection request from the UE 132 for an application and/or service, and the connection request may include information associated with the UE, the application, and/or the service. As described above, the RAN 102 may provide the information associated with the UE 132, the application, and/or the service to the core network, and the core network may identify (e.g., using the NSSF, the AMF, and/or the like) a network slice based on the information associated with the UE 132, the application, and/or the service and provision a communication session on the network slice for the UE 132. For example, the core network may provide, to the RAN 102, information identifying the network slice (e.g., an NSI ID).

In some implementations, the RAN 102, based on receiving the information identifying the network slice, may perform RRM (e.g., using the near-real time RIC 106). As shown in FIG. 1A, and by reference number 150, the RAN 102 may determine SNRs of the subcarrier frequencies 128. For example, the RAN 102 may determine, using the DU 114 and/or the RU 116, the SNRs of the subcarrier frequencies 128. In some implementations, the DU 114 and/or the RU 116 may determine the SNRs of the subcarrier frequencies 128 in real time or near-real time.

As shown in FIG. 1A, and by reference number 152, the RAN 102 may determine aggregate SNRs of the resource blocks 124. In some implementations, the aggregate SNR of a given resource block 124 may be based on SNRs of subcarrier frequencies 128 of the given resource block 124. For example, the aggregate SNR of a given resource block 124 may be an average, a mean, a median, and/or the like of the SNRs of the subcarrier frequencies 128 of the given resource block 124. In some implementations, the RAN 102 may determine, using the DU 114 and/or the RU 116, the aggregate SNRs of the resource blocks 124 (e.g., periodically, in near-real time, in real time, and/or the like).

In some implementations, the RAN 102 may determine an SNR spectrum for the resource blocks 124, where resource blocks 124 having a highest aggregate SNR are on a first end of the SNR spectrum and resource blocks 124 having a lowest aggregate SNR are on a second end of the SNR spectrum. For example, a first resource block having a first aggregate SNR may be on the first end of the SNR spectrum, a second resource block having a second aggregate SNR may be on the second end of the SNR spectrum, and a third resource block having a third aggregate SNR may be between the first end and the second end of the SNR spectrum, when the first aggregate SNR is higher than the third aggregate SNR and the third aggregate SNR is higher than the second aggregate SNR.

In this way, the RAN 102 may determine which resource blocks 124 may be associated with a lower likelihood of retransmissions. For example, if a first resource block has a first aggregate SNR that is higher than a second aggregate SNR of a second resource block, the first resource block may be associated with a lower likelihood of retransmissions than a likelihood of retransmissions to which the second resource block may be associated.

In some implementations, the RAN 102 may arrange, based on the aggregate SNRs, the resource blocks 124 in the slots 122. For example, if a first resource block has a first aggregate SNR that is higher than a second aggregate SNR of a second resource block, the RAN 102 may arrange the first resource block higher in the slot 122 than the second resource block. In some implementations, the RAN 102 may sort, based on the aggregate SNRs, the resource blocks 124 in the slots 122 such that a first resource block having a highest aggregate SNR may be at a top of the slot 122 and a second resource block having a lowest aggregate SNR may be at a bottom of the slot 122.

As shown in FIG. 1B, and by reference number 154, the RAN 102 may determine types of traffic on network slices. For example, the RAN 102 may determine, using the non-real time RIC 104, types of traffic on network slices. In some implementations, the RAN 102 may determine types of traffic on the network slices based on internet protocol (IP) information of network traffic on each network slice, a type of UE associated with each network slice, and/or the like.

In some implementations, multiple applications on the UE 132 may be connected to the RAN 102, and each application may be connected via a different network slice, each carrying different types of traffic. For example, the UE 132 may be an autonomous vehicle, a first application, on the UE 132 and for providing diagnostic information over the network, may be connected via a first network slice, and a second application, on the UE 132 and for vehicle-to-everything (V2X) communication for navigation, may be connected via a second network slice. In such cases, the RAN 102 may determine types of traffic on the network slices based on IP information of the network traffic on each network slice, application information in the network traffic on each network slice, and/or the like.

Additionally, or alternatively, multiple UEs may be connected to the RAN 102, and each UE may be connected via a different network slice, each carrying different types of traffic. For example, a first UE may be a drone (e.g., an unmanned aerial vehicle and/or the like) connected via a first network slice, and a second UE may be a smartphone connected via a second network slice. In such cases, the RAN 102 may determine types of network traffic on the network slices based on a type of UE associated with each network slice.

In some implementations, the RAN 102 may determine whether a type of network traffic on each network slice is first critical level (e.g., mission critical) or second critical level (e.g., not mission critical). For example, the RAN 102 may determine, based on internet protocol (IP) information of network traffic on each network slice, a type of UE associated with each network slice, and/or the like, whether the type of network traffic on each network slice is first critical level or second critical level.

Using the example of the UE 132 being an autonomous vehicle with a first application, for providing diagnostic information over the network, connected via a first network slice, and a second application, for vehicle-to-everything (V2X) communication for navigation, connected via a second network slice, the RAN 102 may determine that the type of network traffic on the first network slice is second critical level (e.g., not mission critical) and that the type of network traffic on the second network slice is first critical level (e.g., mission critical). Using the example of a first UE being a drone connected via a first network slice, and a second UE being a smartphone connected via a second network slice, the RAN 102 may determine that the type of network traffic on the first network slice is first critical level and that the type of network traffic on the second network slice is second critical level.

In some implementations, the RAN 102 may determine a mission criticality spectrum for the types of network traffic, where types of traffic having a highest mission criticality are on a first end of the mission criticality spectrum and types of traffic having a lowest mission criticality are on a second end of the mission criticality spectrum. For example, network traffic for an application for V2X communication for navigation, having a first mission criticality, may be on the first end of the mission criticality spectrum, network traffic for Internet browsing, having a second mission criticality, may be on the second end of the mission criticality spectrum, and network traffic for law enforcement communication, having a third mission criticality, may be between the first end and the second end of the mission criticality spectrum, where the first mission criticality is higher than the third mission criticality and the third mission criticality is higher than the second mission criticality.

Additionally, or alternatively, the RAN 102 may determine a priority spectrum for the types of network traffic, where types of traffic having a highest priority are on a first end of the priority spectrum and types of traffic having a lowest priority are on a second end of the priority spectrum. For example, network traffic for an autonomous vehicle having a first priority may be on the first end of the priority spectrum, network traffic for a smartphone having a second priority may be on the second end of the priority spectrum, and network traffic for an emergency response vehicle being driven by an operator and having a third priority may be between the first end and the second end of the priority spectrum, where the first priority is higher than the third priority and the third priority is higher than the second priority.

In this way, the RAN 102 may determine which network slices may be associated with a higher likelihood of retransmissions. For example, if a first network slice has a type of network traffic that is more mission critical and/or higher priority than a second network slice, the first network slice may be associated with a higher likelihood of retransmission than a likelihood of retransmission to which the second network slice may be associated.

As shown in FIG. 1B, and by reference number 156, the RAN 102 may determine index values of the network slices. In some implementations, the RAN 102 may determine, based on the type of network traffic on each network slice, an index value of each network slice. For example, the RAN 102 may determine, based on whether a type of network traffic on each network slice is mission critical or not mission critical, an index value for each network slice, where a first index value corresponds to mission critical network traffic and a second index value corresponds to not mission critical network traffic.

In some implementations, the RAN 102 may determine, based on the mission criticality spectrum for the types of network traffic, an index value for each network slice. For example, the RAN 102 may determine a lowest index value for a first network slice having a first type of network traffic having a highest mission criticality, and the RAN 102 may determine a highest index value for a second network slice having a second type of network traffic having a lowest mission criticality. The RAN 102 may determine an index value between the lowest index value and the highest index value for a third network slice having a third type of network traffic having a third mission criticality, where the third mission criticality is less than the highest mission criticality and more than the lowest mission criticality.

Additionally, or alternatively, the RAN 102 may determine, based on the priority spectrum for the types of network traffic, an index value for each network slice. For example, the RAN 102 may determine a lowest index value for a first network slice having a first type of network traffic having a highest priority, and the RAN 102 may determine a highest index value for a second network slice having a second type of network traffic having a lowest priority. The RAN 102 may determine an index value between the lowest index value and the highest index value for a third network slice having a third type of network traffic having a third priority, where the third priority is less than the highest priority and more than the lowest priority.

In this way, the RAN 102 may determine index values for the network slices, where lower index values correspond to network slices having types of network traffic associated with higher likelihoods of retransmission and higher index values correspond to network slices having types of network traffic associated with lower likelihoods of retransmission.

As shown in FIG. 1C, and by reference number 158, the RAN 102 may map the resource blocks to the network slices. In some implementations, the RAN 102 may map the resource blocks to the network slices using the DU 114, the CU-CP 110, the CU-UP 112, and/or the like. In some implementations, the RAN 102 may map the resource blocks 124 to network slices by assigning symbols 126 and subcarrier frequencies 128 to a network slice. In some implementations, the RAN 102 may determine a throughput need of each network slice to determine a number of resource blocks to be mapped to each network slice.

In some implementations, the RAN 102 may map, based on the aggregate SNR of each resource block and based on the index value of each network slice, a resource block to a network slice. For example, the RAN 102 may map a first resource block having a highest aggregate SNR of the resource blocks to a first network slice having a lowest index value of the network slices, and the RAN 102 may map a second resource block having a lowest aggregate SNR of the resource blocks to a second network slice having a highest index value of the network slices.

As another example, a first resource block, a second resource block, and a third resource block may have a first aggregate SNR, a second aggregate SNR, and a third aggregate SNR, respectively, where the first aggregate SNR is higher than the second aggregate SNR and the third aggregate SNR, and the third aggregate SNR is higher than the second aggregate SNR. A first network slice, a second network slice, and a third network slice may have a first index value, a second index value, and a third index value, respectively, where the first index value is lower than the second index value and the third index value, and the third index value is lower than the second index value. In such an example, the RAN 102 may map the first resource block to the first network slice, the second resource block to the second network slice, and the third resource block to the third network slice.

In some implementations, the RAN 102 may determine the SNR spectrum for the resource blocks 124 as described herein with respect to FIG. 1A, and the RAN 102 may determine, based on the mission criticality spectrum for the types of network traffic, an index value for each network slice as described herein with respect to FIG. 1B. In such implementations, the RAN 102 may map, based on the SNR spectrum for the resource blocks 124 and based on the index values determined based on the mission criticality spectrum, the resource blocks 124 to the network slices. For example, the RAN 102 may map resource blocks on a first end of the SNR spectrum (e.g., resource blocks having higher aggregate SNRs) to network slices having index values corresponding to the first end of the mission criticality spectrum (e.g., network slices having higher mission criticality), and resource blocks on a second end of the SNR spectrum (e.g., resource blocks having lower aggregate SNRs) to network slices having index values corresponding to the second end of the mission criticality spectrum (e.g., network slices having lower mission criticality).

Additionally, or alternatively, the RAN 102 may determine the SNR spectrum for the resource blocks 124 as described herein with respect to FIG. 1A, and the RAN 102 may determine, based on the priority spectrum for the types of network traffic, an index value for each network slice as described herein with respect to FIG. 1B. In such implementations, the RAN 102 may map, based on the SNR spectrum for the resource blocks 124 and based on the index values determined based on the priority spectrum, the resource blocks 124 to the network slices in a manner similar to that described with respect to the mission criticality spectrum.

In this way, the RAN 102 may map resource blocks associated with a lower likelihood of retransmissions (e.g., due to a higher aggregate SNR) to network slices with a higher likelihood of retransmissions (e.g., due to network traffic that is more mission critical and/or higher priority). By mapping resource blocks associated with a lower likelihood of retransmission to network slices with a higher likelihood of retransmissions, the RAN 102 may reduce the likelihood of network slices requiring the RAN 102 to perform retransmissions. Furthermore, by reducing the likelihood of network slices requiring the RAN 102 to perform retransmissions, the RAN 102 may conserve network resources that would otherwise be consumed by performing retransmissions. Additionally, or alternatively, by reducing the likelihood of network slices requiring the RAN 102 to perform retransmissions, the RAN 102 may reduce and/or eliminate retransmissions and/or delays that may cause property damage (e.g., crashed drones, vehicle accidents, and/or the like), which may consume financial resources.

In some implementations, the RAN 102 may periodically, in near-real time, in real time, and/or the like determine an updated aggregate SNR of each resource block and re-map, based on the updated aggregate SNR of each resource block and based on the index value of each network slice, the resource blocks to the network slices. In this way, the RAN 102 may re-map resource blocks to the network slices as conditions of the RAN 102 change (e.g., changes in weather, changes in SNRs of subcarrier frequencies, changes in UE locations, changes in number, types, and/or the like of UEs connected the RAN 102, changes to numbers, types, and/or the like of network slices, and/or the like).

Figure 1D:
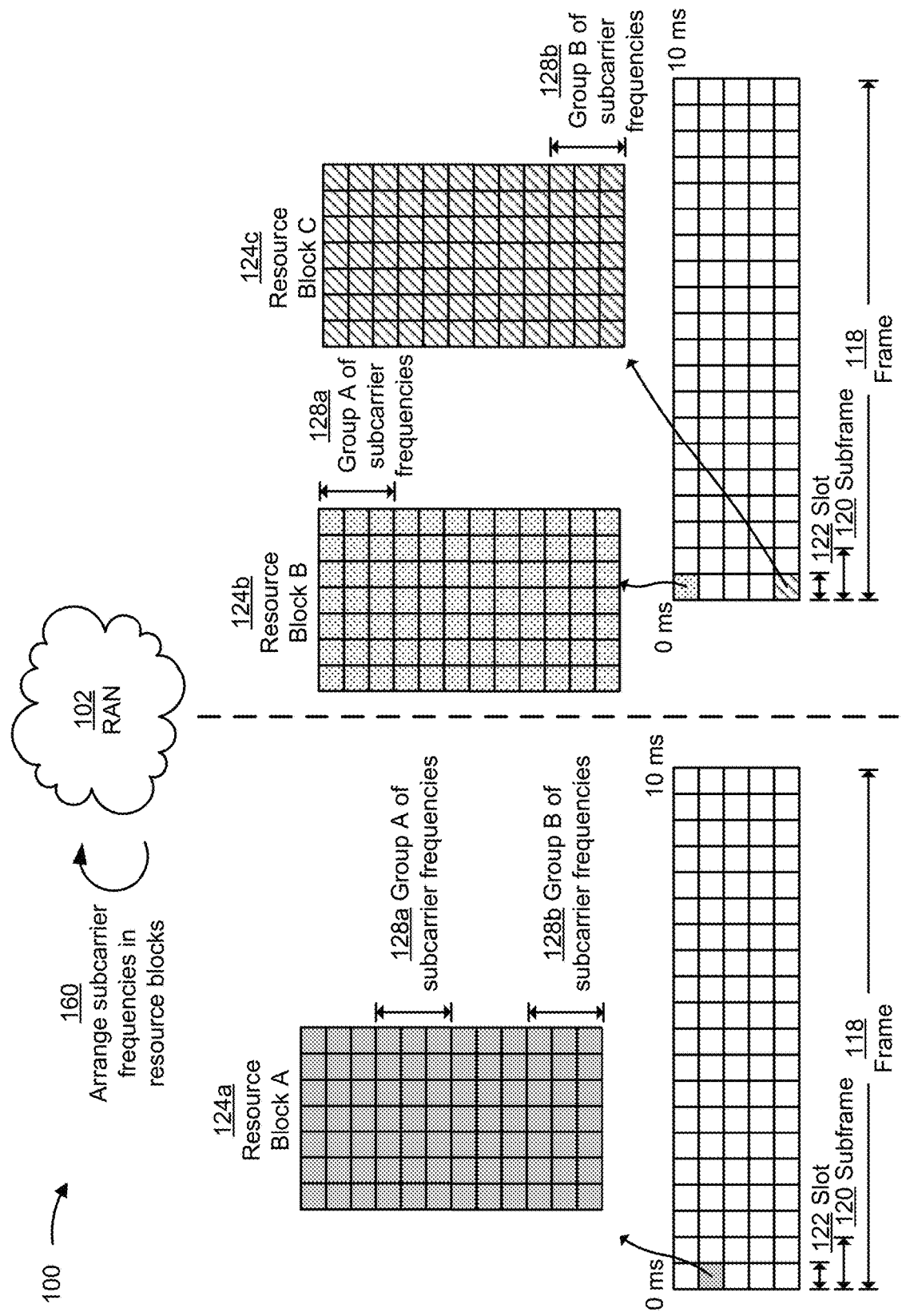

As shown in FIG. 1D, and by reference number 160, the RAN 102 may arrange the subcarrier frequencies in the resource blocks. For example, the RAN 102, using the CU 108, may provide instructions to the DU 114 to arrange the subcarrier frequencies in the resource blocks. In some implementations, the RAN 102 may periodically, in near-real time, in real time, and/or the like arrange the subcarrier frequencies in the resource blocks.

In some implementations, the RAN 102 may arrange the subcarrier frequencies to optimize network performance independent of the network traffic. For example, and as shown on the left side of FIG. 1D, the RAN 102 may arrange Group A of subcarrier frequencies 128*a* and Group B of subcarrier frequencies 128*b* in resource block 124*a* to optimize network performance even though the Group A subcarrier frequencies 128*a* have highest SNRs of the subcarrier frequencies in the slot 122, and the Group B subcarrier frequencies 128*b* have lowest SNRs of the subcarrier frequencies in the slot 122.

In some implementations, the RAN 102 may arrange the subcarrier frequencies in the resource blocks based on the network traffic (e.g., the type of network traffic on the network slices and/or the like). For example, the RAN 102 may arrange the subcarrier frequencies in the resource blocks such that a first resource block includes subcarrier frequencies having the highest SNR and a second resource block includes subcarrier frequencies having the lowest SNR. In such an example, the first resource block may have the highest aggregate SNR, and the second resource block may have the lowest aggregate SNR. The RAN 102 may map the first resource block to a first network slice for mission critical traffic (e.g., having a lowest index value) and the second resource block to a second network slice for not mission critical traffic (e.g., having a highest index value).

As shown on the right side of FIG. 1D, the RAN 102 may arrange Group A of subcarrier frequencies 128*a* in resource block B 124*b*, and the RAN 102 may arrange Group B of subcarrier frequencies 128*b* in resource block C 124*c*. In some implementations, and as shown in FIG. 1D, because the Group A subcarrier frequencies 128*a* have the highest SNRs of the subcarrier frequencies in the slot 122, the RAN 102 may arrange the Group A subcarrier frequencies 128*a* at a top of the resource block B 124*b*, which may be at a top of the slot 122. As also shown in FIG. 1D, because the Group B subcarrier frequencies 128*b* have the lowest SNRs of the subcarrier frequencies in the slot 122, the RAN 102 may arrange the Group B subcarrier frequencies 128*b* at a bottom of the resource block C 124*c*, which may be at a bottom of the slot 122. In some implementations, due to the RAN 102 arranging the subcarrier frequencies in the resource blocks based on the network traffic, resource block B 124*b* may have a higher aggregate SNR than aggregate SNRs of resource block A 124*a* and resource block C 124*c*, and resource block C 124*c* may have a lower aggregate SNR than an aggregate SNR of resource block A 124*a*.

In this way, the RAN 102 may arrange the subcarrier frequencies in the resource blocks to define resource blocks having aggregate SNRs based on the network traffic, and may map resource blocks with a lower likelihood of retransmissions (e.g., due to a higher aggregate SNR) to network slices with a higher likelihood of retransmissions (e.g., due to network traffic that is more mission critical and/or higher priority). By arranging the subcarrier frequencies in the resource blocks based on the network traffic and mapping resource blocks associated with a lower likelihood of retransmission to network slices with a higher likelihood of retransmissions, the RAN 102 may reduce the likelihood of network slices requiring the RAN 102 to perform retransmissions.

In some implementations, the RAN 102 may use a machine learning model to improve mapping resource blocks to network slices to reduce a likelihood of retransmissions. For example, the RAN 102 may perform, using the near-real time RIC 106, training module management. In some implementations, the RAN 102 may train the machine learning model based on one or more parameters associated with mapping resource blocks to network slices, such as aggregate SNRs of resource blocks, SNRs of subcarrier frequencies, types of network traffic, network slices, and/or the like, as described herein with respect to FIG. 5. Using historical data associated with mapping resource blocks to network slices and performance data (e.g., number of retransmissions, retransmission rates, network resources consumed, and/or the like) and the one or more parameters as inputs to the machine learning model, the RAN 102 may use the machine learning model to improve mapping resource blocks to network slices to reduce a likelihood of retransmissions (e.g., a retransmission rate) as described herein with respect to FIG. 6.

As indicated above, FIGS. 1A-1D are provided as examples. Other examples can differ from what is described with regard to FIGS. 1A-1D. For example, although lower index values correspond to network slices having types of network traffic associated with higher likelihoods of retransmission, and higher index values correspond to network slices having types of network traffic associated with lower likelihoods of retransmission in the examples of FIGS. 1A-1D, higher index values may correspond to network slices having types of network traffic associated with higher likelihoods of retransmission and lower index values may correspond to network slices having types of network traffic associated with lower likelihoods of retransmission in other examples. In such examples, the RAN 102 may map resource blocks having higher aggregate SNRs to network slices having higher index values and resource blocks having lower aggregate SNRs to network slices having lower index values.

Although the example implementations describe functions being performed by the RAN 102 in a virtualized RAN, other example implementations may include the above described functions being performed by a baseband unit (BBU). For example, a BBU may include a DU, an RU, and a RIC, may be located at the base of a cell tower, and may control one or more radio antennae on the cell tower.

The number and arrangement of devices and networks shown in FIGS. 1A-1D are provided as one or more examples. In practice, there may be additional devices and/or networks, fewer devices and/or networks, different devices and/or networks, or differently arranged devices and/or networks than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) of example implementation(s) 100 may perform one or more functions described as being performed by another set of devices of example implementation(s) 100.

Figure 2:
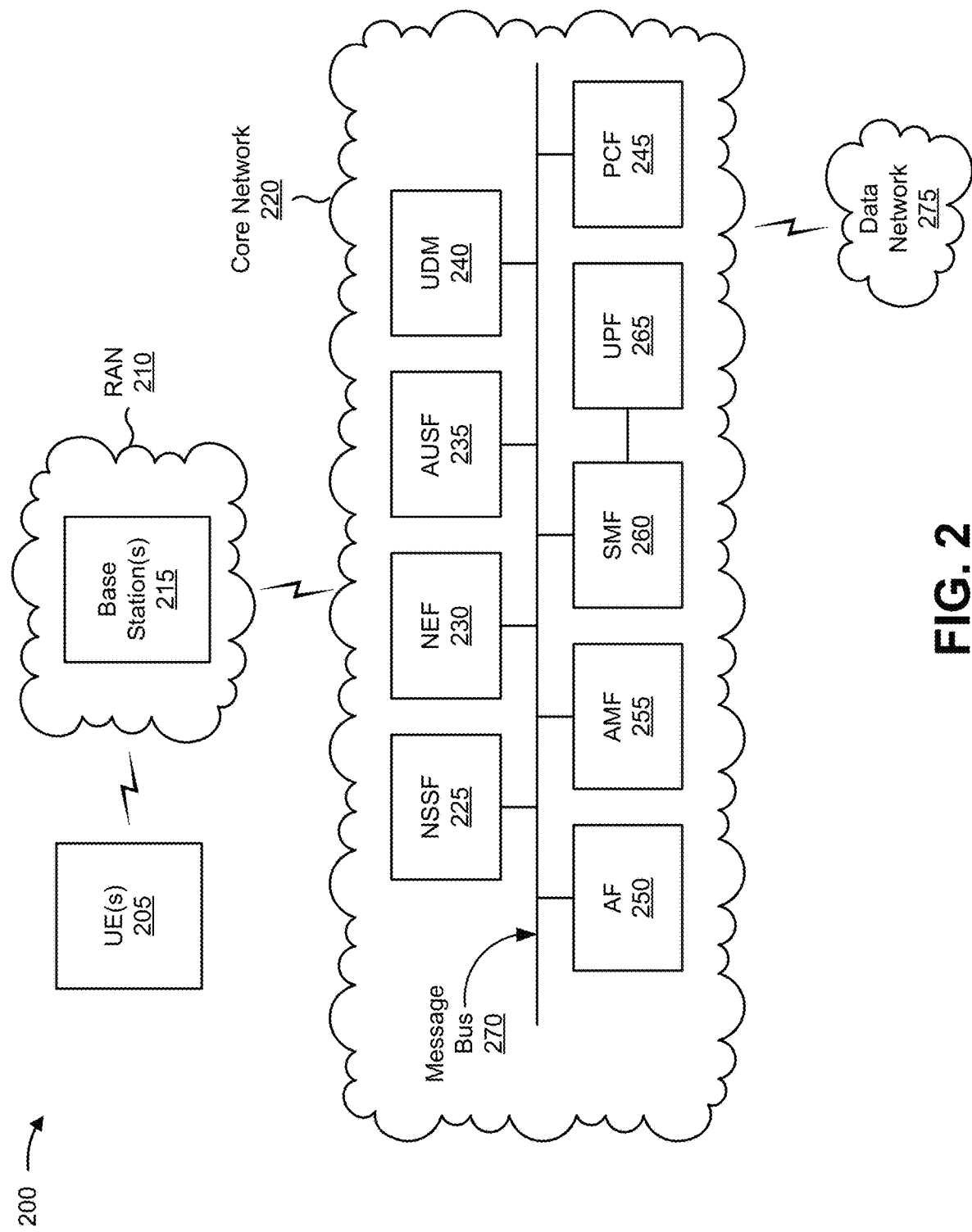
FIG. 2 is a diagram of an example environment in which systems and/or methods described herein may be implemented.

FIG. 2 is a diagram of an example environment 200 in which systems, functional architectures, and/or methods described herein may be implemented. As shown in FIG. 2, environment 200 may include a UE 205, a RAN 210, a base station 215, a core network 220, and a data network 275. As further shown in FIG. 2, core network 220 may include, for example, a Network Slice Selection Function (NSSF) 225, a Network Exposure Function (NEF) 230, an Authentication Server Function (AUSF) 235, a Unified Data Management (UDM) function 240, a Policy Control Function (PCF) 245, an Application Function (AF) 250, an Access and Mobility Management Function (AMF) 255, a Session Management Function (SMF) 260, and a User Plane Function (UPF) 265, which may be communicatively connected via a message bus 270 that may be comprised of one or more physical communication channels and/or one or more virtual communication channels. Devices of environment 200 may interconnect via wired connections, wireless connections, or a combination of wired and wireless connections.

UE 205 includes one or more devices capable of communicating with base station 215 and/or a network (e.g., RAN 102). For example, UE 205 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, user equipment, and/or a similar device. UE 205 may be capable of communicating using uplink (e.g., UE to base station) communications, downlink (e.g., base station to UE) communications, and/or sidelink (e.g., UE-to-UE) communications. In some implementations, UE 205 may include a machine-type communication (MTC) UE, such as an evolved or enhanced MTC (eMTC) UE. In some implementations, UE 205 may include an Internet of Things (IoT) UE, such as a narrowband IoT (NB-IoT) UE and/or the like.

RAN 210 includes a base station and is operatively connected, via a wired and/or wireless connection, to the core network 220 through UPF 265. RAN 210 may facilitate communications sessions between UEs and data network 275 by communicating application-specific data between RAN 210 and core network 220. Data network 275 includes various types of data networks, such as the Internet, a third-party services network, an operator services network, a private network, a wide area network, and/or the like.

Base station 215 includes one or more devices capable of communicating with UE 205 using a cellular RAT. For example, base station 215 may include a base transceiver station, a radio base station, a node B, an evolved node B (eNB), a gNB, a base station subsystem, a cellular site, a cellular tower (e.g., a cell phone tower, a mobile phone tower, etc.), an access point, a transmit receive point (TRP), a radio access node, a macrocell base station, a microcell base station, a picocell base station, a femtocell base station, or a similar type of device. Base station 215 may transfer traffic between UE 205 (e.g., using a cellular RAT), other base stations 215 (e.g., using a wireless interface or a backhaul interface, such as a wired backhaul interface), RAN 210, and/or data network 275. Base station 215 may provide one or more cells that cover geographic areas. Some base stations 215 may be mobile base stations. Some base stations 215 may be capable of communicating using multiple RATs.

In some implementations, base station 215 may perform scheduling and/or resource management for UEs 205 covered by base station 215 (e.g., UEs 205 covered by a cell provided by base station 215). In some implementations, base stations 215 may be controlled or coordinated by a network controller, which may perform load balancing, network-level configuration, and/or the like. The network controller may communicate with base stations 215 via a wireless or wireline backhaul. In some implementations, base station 215 may include a network controller, a self-organizing network (SON) module or component, or a similar module or component. In other words, a base station 215 may perform network control, scheduling, and/or network management functions (e.g., for other base stations 215 and/or for uplink, downlink, and/or sidelink communications of UEs 205 covered by the base station 215).

In some implementations, base station 215 may include a central unit and multiple distributed units. The central unit may coordinate access control and communication with regard to the multiple distributed units. The multiple distributed units may provide UEs 205 and/or other base stations 215 with access to core network 220 or data network 275. For example, in some implementations, the central unit may be a logical node that hosts Radio Resource Control (RRC) and Packet Data Convergence Protocol (PDCP) protocols of base station 215 and optionally further hosts a Service Data Adaptation Protocol (SDAP) protocol of base station 215. The multiple distributed units may be logical nodes that host Radio Link Control (RLC), Medium Access Control (MAC), and Physical (PHY) layers of base station 215. In some implementations, one distributed unit may include one or more radios that are used to support one or multiple cells that may provide UEs 205 and/or other base stations 215 with access to core network 220 or data network 275. Furthermore, in some implementations, the central unit may be disaggregated or otherwise split into control plane and user plane nodes. For example, the control plane node may be a logical node hosting the RRC and the control plane part of the PDCP protocol for the central unit of base station 215 while the user plane node may be a logical node that hosts the user plane part of the PDCP protocol and optionally further hosts the SDAP protocol for the central unit of base station 215. In some implementations, a split of layers and/or protocols among the central unit and the multiple distributed units may be flexible.

Accordingly, as used herein, a node associated with RAN 210 (which may be referred to as a "RAN node") may include base station 215, a distributed unit of base station 215, a central unit of base station 215, a control plane part of the central unit of base station 215, a user plane part of the central unit of base station 215, and/or any suitable combination thereof.

Core network 220 may include various functional elements included in a 5G wireless telecommunications system, which may be implemented by one or more of devices (e.g., a device described below with respect to FIG. 3). While the example functional architecture of core network 220 shown in FIG. 2 may be an example of a service-based architecture, in some implementations, core network 220 may be implemented as a reference-point architecture.

As mentioned above, core network 220 may include various functional elements. The functional elements may include, for example, NSSF 225, NEF 230, AUSF 235, UDM 240, PCF 245, AF 250, AMF 255, SMF 260, and UPF 265. These functional elements may be communicatively connected via a message bus 270, which may be comprised of one or more physical communication channels and/or one or more virtual communication channels. Each of the functional elements shown in FIG. 2 is implemented on one or more devices associated with a wireless telecommunications system. In some implementations, one or more of the functional elements may be implemented on physical devices, such as an access point, a base station, a gateway, a server, and/or the like. In some implementations, one or more of the functional elements may be implemented on one or more computing devices of a cloud computing environment associated with the wireless telecommunications system. In some implementations, the core network 220 may be operatively connected to a RAN 210, a data network 275, and/or the like, via wired and/or wireless connections with UPF 265.

NSSF 225 may select network slice instances for one or more UEs, such as UE(s) 205, where NSSF 225 may determine a set of network slice policies to be applied at the RAN 210. By providing network slicing, NSSF 225 allows an operator to deploy multiple substantially independent end-to-end networks potentially with the same infrastructure. In some implementations, each network slice may be customized for different services. NEF 230 may support the exposure of capabilities and/or events in the wireless telecommunications system to help other entities in the wireless telecommunications system discover network services and/or utilize network resources efficiently.

AUSF 235 may act as an authentication server and support the process of authenticating UEs in the wireless telecommunications system. UDM 240 may store subscriber data and profiles in the wireless telecommunications system. UDM 240 may be used for fixed access, mobile access, and/or the like, in core network 220. PCF 245 may provide a policy framework that incorporates network slicing, roaming, packet processing, mobility management, and/or the like.

AF 250 may determine whether UEs provide preferences for a set of network slice policies and support application influence on traffic routing, access to NEF 230, policy control, and/or the like. AMF 255 may provide authentication and authorization of UEs. SMF 260 may support the establishment, modification, and release of communications sessions in the wireless telecommunications system. For example, SMF 260 may configure traffic steering policies at UPF 265, enforce UE IP address allocation and policies, and/or the like. AMF 255 and SMF 260 may act as a termination point for Non-Access Stratum (NAS) signaling, mobility management, and/or the like. SMF 260 may act as a termination point for session management related to NAS. RAN 210 may send information (e.g. the information that identifies the UE) to AMF 255 and/or SMF 260 via PCF 245.

UPF 265 may serve as an anchor point for intra/inter Radio Access Technology (RAT) mobility. UPF 265 may apply rules to packets, such as rules pertaining to packet routing, traffic reporting, handling user plane QoS, and/or the like. UPF 265 may determine an attribute of application-specific data that is communicated in a communications session. UPF 265 may receive information (e.g., the information that identifies the communications attribute of the application) from RAN 210 via SMF 260 or an application programming interface (API).

Message bus 270 represents a communication structure for communication among the functional elements. In other words, message bus 270 may permit communication between two or more functional elements. Message bus 270 may be a message bus, Hypertext Transfer Protocol Version 2 (HTTP/2) proxy server, and/or the like.

The number and arrangement of functional elements in core network 220 are provided as one or more examples. In practice, core network 220 may have additional functional elements, fewer functional elements, different functional elements, or differently arranged functional elements than those shown in FIG. 2. Furthermore, two or more functional elements in core network 220 may be implemented within a single device, or a single functional element in core network 220 may be implemented as multiple, distributed devices. Additionally, or alternatively, a set of functional elements (e.g., one or more functional elements) of core network 220 may perform one or more functions described as being performed by another set of functional elements of core network 220.

Data network 275 may include various types of data networks, such as the Internet, a third-party services network, an operator services network, a private network, a wide area network, and/or the like. In some implementations, data network 275 may include one or more application servers configured to support one or more applications associated with a session at the UE(s) 205. Furthermore, in some implementations, data network 275 may include one or more application servers that are deployed at an edge of RAN 210, with such application server(s) co-located with one or more nodes that are associated with RAN 210 (e.g., one or more distributed and/or central units associated with base station 215) and/or one or more nodes associated with core network 220 (e.g., UPF 265) to support sessions that are associated with a low-latency service level agreement (SLA).

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
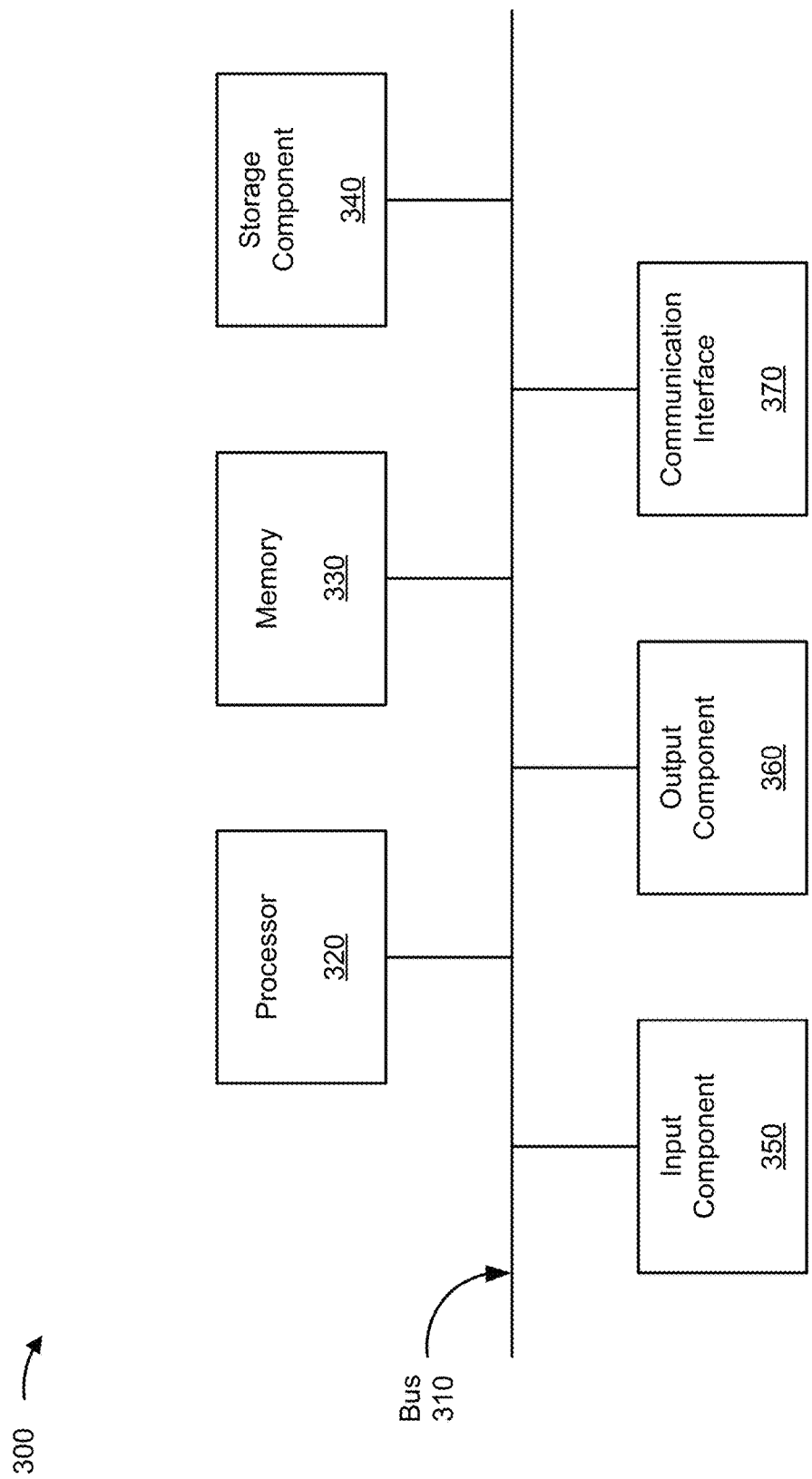
FIG. 3 is a diagram of example components of one or more devices of FIG. 2.

FIG. 3 is a diagram of example components of a device 300. Device 300 may correspond to UE 205, base station 215, a node associated with base station 215 (e.g., a distributed unit of base station 215, a central unit of base station 215, a control plane part of the central unit of base station 215, and/or a user plane part of the central unit of base station 215), NSSF 225, NEF 230, AUSF 235, UDM 240, PCF 245, AF 250, AMF 255, SMF 260, UPF 265, and/or message bus 270. In some implementations, UE 205, base station 215 (or a node associated with base station 215), NSSF 225, NEF 230, AUSF 235, UDM 240, PCF 245, AF 250, AMF 255, SMF 260, UPF 265, and/or message bus 270 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as one or more examples. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
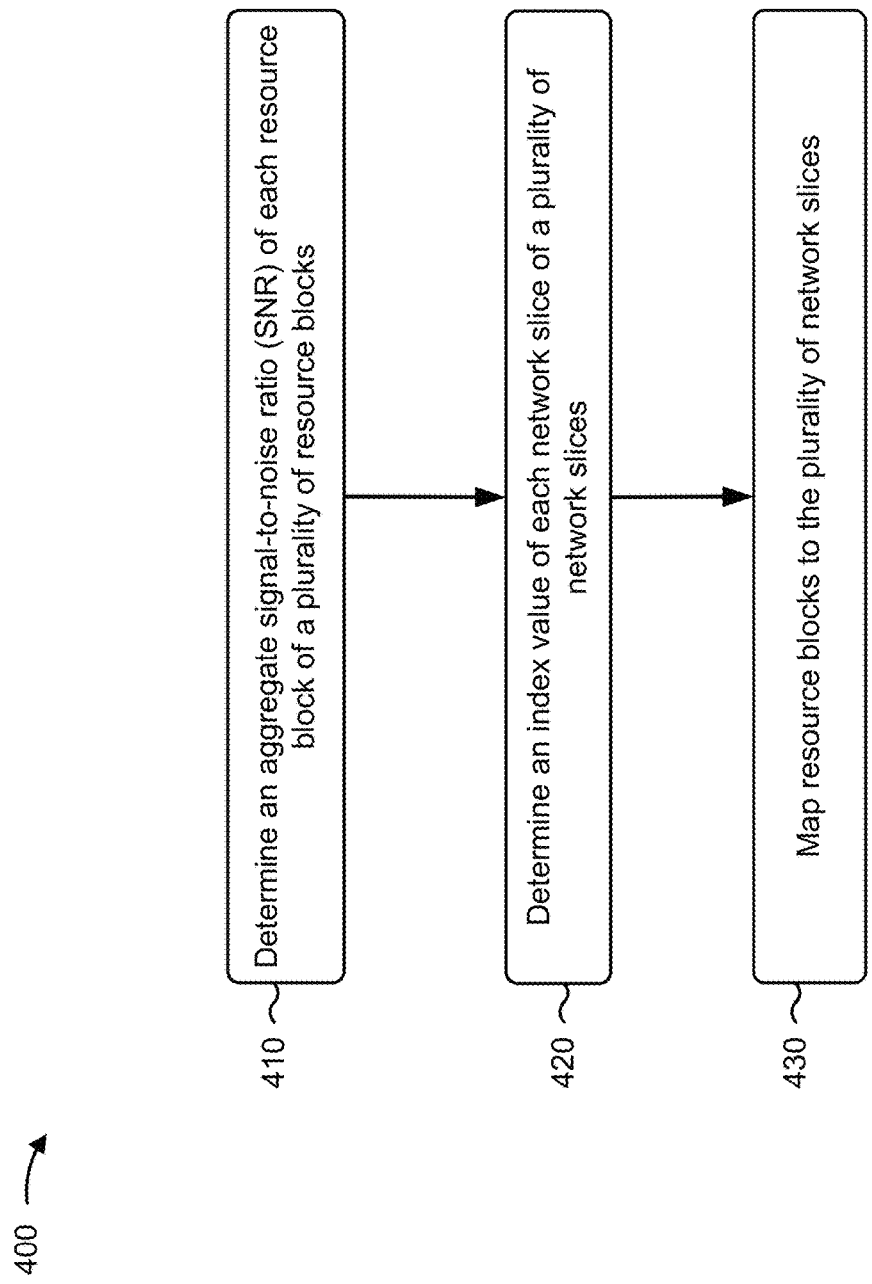
FIG. 4 is a flow chart of an example process for mapping resource blocks to network slices.

FIG. 4 is a flow chart of an example process 400 for mapping resource blocks to network slices. In some implementations, one or more process blocks of FIG. 4 may be performed by a radio access network (RAN) node, such as a base station (e.g., base station 215) or one or more nodes associated with a base station (e.g., a distributed unit (DU), a central unit (CU), a central unit control plane (CU-CP) node, a central unit user plane (CU-UP) node, and/or the like). In some implementations, one or more process blocks of FIG. 4 may be performed by another device or a group of devices separate from or including the RAN node, such as a UE (e.g., UE 205), a core network element (e.g., NSSF 225, NEF 230, AUSF 235, UDM 240, PCF 245, AF 250, AMF 255, SMF 260, UPF 265, and/or the like), and/or the like. In some implementations, one or more process blocks of FIG. 4 may be performed by the RAN node using processor 320, memory 330, storage component 340, input component 350, output component 360, communication interface 370, and/or the like.

As shown in FIG. 4, process 400 may include determining an aggregate signal-to-noise ratio (SNR) of each resource block of a plurality of resource blocks (block 410). For example, the RAN node may determine an aggregate SNR of each resource block of a plurality of resource blocks, as described above. In some implementations, the aggregate SNR of a given resource block of the plurality of resource blocks is based on SNRs of subcarrier frequencies of the given resource block. For example, process 400 may include determining a first aggregate SNR of a first resource block, a second aggregate SNR of a second resource block, and a third aggregate SNR of a third resource block, where the first, second, and the third aggregate SNRs are based on SNRs of subcarrier frequencies of the first, second, and third resource blocks, respectively.

As further shown in FIG. 4, process 400 may include determining an index value of each network slice of a plurality of network slices (block 420). In some implementations, process 400 may include determining, based on a type of network traffic on each network slice of a plurality of network slices, an index value of each network slice of the plurality of network slices. For example, the RAN node may determine, based on a type of network traffic on each network slice of a plurality of network slices, an index value of each network slice of the plurality of network slices, as described above. Process 400 may include determining a first index value of a first network slice, a second index value of a second network slice, and a third index value of a third network slice, where the first, second, and third index values are based on a type of network traffic on the first, second, and third network slices, respectively.

In some implementations, the type of network traffic on each network slice is mission critical or not mission critical, and a first index value of a first network slice for mission critical traffic is lower than a second index value of a second network slice for not mission critical traffic. In another example, the type of network traffic on each network slice is first priority, second priority, or third priority, and a first index value of a first network slice for first priority traffic is lower than a second index value of a second network slice for second priority traffic, and the second index value of the second network slice is lower than a third index value of a third network slice for third priority traffic.

In some implementations, process 400 includes determining the type of network traffic on each network slice based on at least one of a type of user equipment associated with each network slice or internet protocol information of network traffic on each network slice.

As further shown in FIG. 4, process 400 may include mapping resource blocks to the plurality of network slices (block 430). In some implementations, process 400 may include mapping, based on the aggregate SNR of each resource block, based on the index value of each network slice, and for each resource block of the plurality of resource blocks, a resource block of the plurality of resource blocks to a network slice of the plurality of network slices. For example, the RAN node may map, based on the aggregate SNR of each resource block, based on the index value of each network slice, and for each resource block of the plurality of resource blocks, a resource block of the plurality of resource blocks to a network slice of the plurality of network slices, as described above. As another example, the RAN node may map a first resource block having a highest aggregate SNR of the plurality of resource blocks to a first network slice having a lowest index value of the plurality of network slices, and map a second resource block having a lowest aggregate SNR of the plurality of resource blocks to a second network slice having a highest index value of the plurality of network slices.

In some implementations, process 400 may include mapping, based on a first aggregate SNR of a first resource block being higher than a second aggregate SNR of a second resource block and based on a first index value of a first network slice being lower than a second index value of a second network slice, the first resource block to the first network slice and the second resource block to the second network slice. Process 400 may further include mapping, based on the first aggregate SNR being higher than a third aggregate SNR of a third resource block, based on the third aggregate SNR being higher than the second aggregate SNR, based on the first index value being lower than a third index value of a third network slice, and based on the third index value being lower than the second index value, the third resource block to the third network slice.

In some implementations, process 400 includes periodically, in near-real time, in real time, and/or the like, determining, by the RAN node, an updated aggregate SNR of each resource block of the plurality of resource blocks, and periodically, in near-real time, in real time, and/or the like remapping, by the RAN node, based on the updated aggregate SNR of each resource block of the plurality of resource blocks, based on the index value of each network slice of the plurality of network slices, and for each resource block of the plurality of resource blocks, the resource block of the plurality of resource blocks to another network slice of the plurality of network slices.

In some implementations, process 400 includes arranging a first group of subcarrier frequencies having highest SNRs in a first resource block of the plurality of resource blocks and arranging a second group of subcarrier frequencies having lowest SNRs in a second resource block of the plurality of resource blocks.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
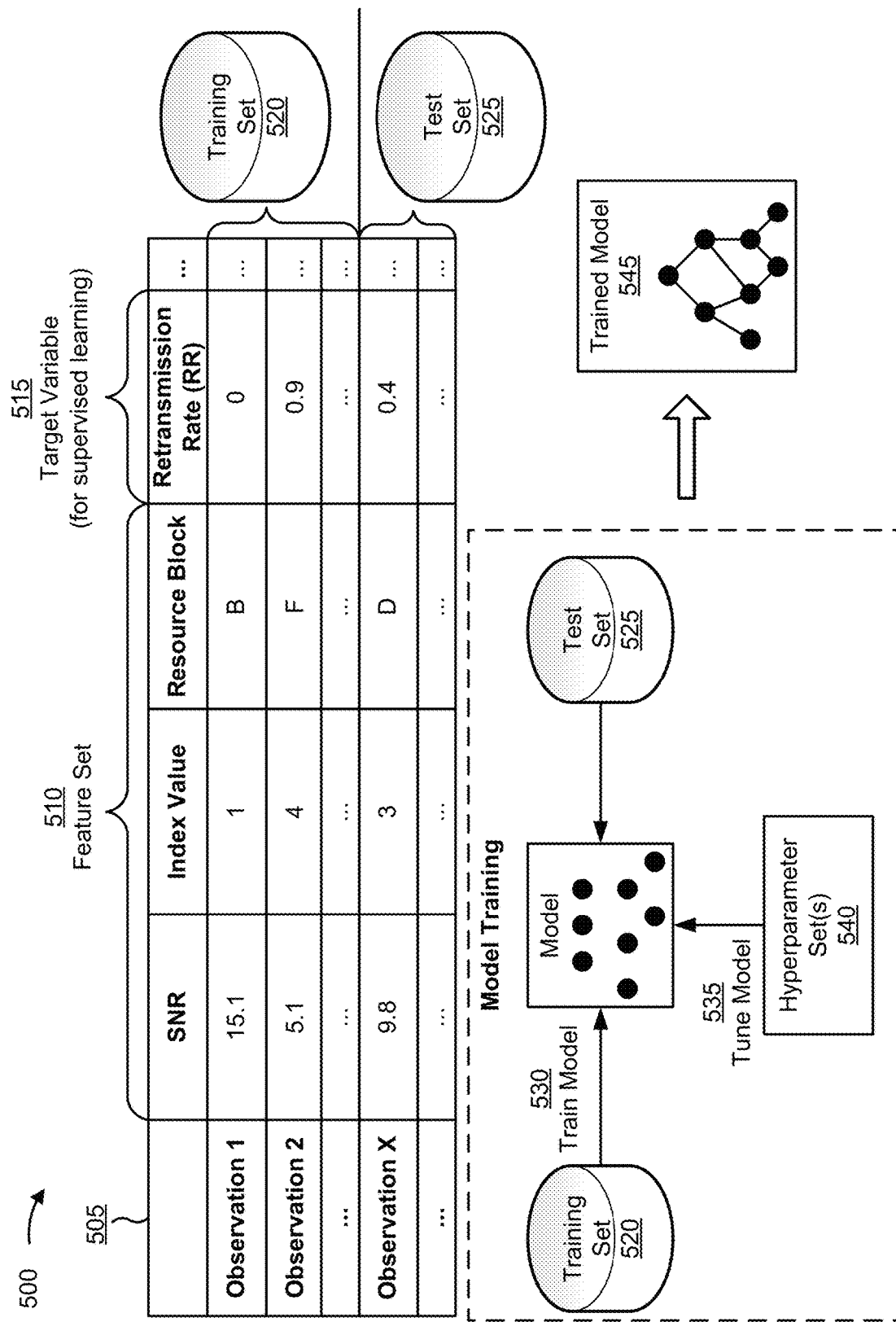
FIG. 5 is a diagram illustrating an example of training a machine learning model.

FIG. 5 is a diagram illustrating an example 500 of training a machine learning model. The machine learning model training described herein may be performed using a machine learning system. The machine learning system may include a computing device, a server, a cloud computing environment, and/or the like, such as a RAN (e.g., RAN 210), a base station (e.g., base station 215), a core network (e.g., core network 220).

As shown by reference number 505, a machine learning model may be trained using a set of observations. The set of observations may be obtained and/or input from historical data, such as data gathered during one or more processes described herein. For example, the set of observations may include data gathered from determining SNRs of subcarrier frequencies, determining aggregate SNRs of resource blocks, determining index values for network slices, mapping resources blocks to network slices, monitoring network performance, as described elsewhere herein. In some implementations, the machine learning system may receive the set of observations (e.g., as input) from one or more base stations, the core network, and/or the data network.

As shown by reference number 510, a feature set may be derived from the set of observations. The feature set may include a set of variable types. A variable type may be referred to as a feature. A specific observation may include a set of variable values corresponding to the set of variable types. A set of variables values may be specific to an observation. In some cases, different observations may be associated with different sets of variable values, sometimes referred to as feature values. In some implementations, the machine learning system may determine variable values for a specific observation based on input received from one or more base stations, the core network, and/or the data network. For example, the machine learning system may identify a feature set (e.g., one or more features and/or corresponding feature values) from structured data input to the machine learning system, such as by extracting data from a particular column of a table, extracting data from a particular field of a form, extracting data from a particular field of a message, extracting data received in a structured data format, and/or the like. In some implementations, the machine learning system may determine features (e.g., variables types) for a feature set based on input received from one or more base stations, the core network, and/or the data network, such as by extracting or generating a name for a column, extracting or generating a name for a field of a form and/or a message, extracting or generating a name based on a structured data format, and/or the like. Additionally, or alternatively, the machine learning system may receive input from an operator to determine features and/or feature values. In some implementations, the machine learning system may perform natural language processing and/or another feature identification technique to extract features (e.g., variable types) and/or feature values (e.g., variable values) from text (e.g., unstructured data) input to the machine learning system, such as by identifying keywords and/or values associated with those keywords from the text.

As an example, a feature set for a set of observations may include a first feature of SNR (e.g., an aggregate SNR), a second feature of index value, a third feature of resource block, and so on. As shown, for a first observation, the first feature may have a value of 15.1, the second feature may have a value of 1, the third feature may have a value of B, and so on. These features and feature values are provided as examples, and may differ in other examples. For example, the feature set may include one or more of the following features: an identifier for a base station, an identifier for a RAN, a transmission frequency, a distance from a base station to UE, a number of UE connected to a RAN, and/or the like. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources, memory, and/or the like) used to train the machine learning model.

As shown by reference number 515, the set of observations may be associated with a target variable type (e.g., a retransmission rate). The target variable type may represent a variable having a numeric value (e.g., an integer value, a floating point value, and/or the like), may represent a variable having a numeric value that falls within a range of values or has some discrete possible values, may represent a variable that is selectable from one of multiple options (e.g., one of multiples classes, classifications, labels, and/or the like), may represent a variable having a Boolean value (e.g., 0 or 1, True or False, Yes or No), and/or the like. A target variable type may be associated with a target variable value, and a target variable value may be specific to an observation. In some cases, different observations may be associated with different target variable values.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model, a predictive model, and/or the like. When the target variable type is associated with continuous target variable values (e.g., a range of numbers and/or the like), the machine learning model may employ a regression technique. When the target variable type is associated with categorical target variable values (e.g., classes, labels, and/or the like), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, an automated signal extraction model, and/or the like. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 520 that includes a first subset of observations, of the set of observations, and a test set 525 that includes a second subset of observations of the set of observations. The training set 520 may be used to train (e.g., fit, tune, and/or the like) the machine learning model, while the test set 525 may be used to evaluate a machine learning model that is trained using the training set 520. For example, for supervised learning, the test set 520 may be used for initial model training using the first subset of observations, and the test set 525 may be used to test whether the trained model accurately predicts target variables in the second subset of observations. In some implementations, the machine learning system may partition the set of observations into the training set 520 and the test set 525 by including a first portion or a first percentage of the set of observations in the training set 520 (e.g., 75%, 80%, or 85%, among other examples) and including a second portion or a second percentage of the set of observations in the test set 525 (e.g., 25%, 20%, or 15%, among other examples). In some implementations, the machine learning system may randomly select observations to be included in the training set 520 and/or the test set 525.

As shown by reference number 530, the machine learning system may train a machine learning model using the training set 520. This training may include executing, by the machine learning system, a machine learning algorithm to determine a set of model parameters based on the training set 520. In some implementations, the machine learning algorithm may include a regression algorithm (e.g., linear regression, logistic regression, and/or the like), which may include a regularized regression algorithm (e.g., Lasso regression, Ridge regression, Elastic-Net regression, and/or the like). Additionally, or alternatively, the machine learning algorithm may include a decision tree algorithm, which may include a tree ensemble algorithm (e.g., generated using bagging and/or boosting), a random forest algorithm, a boosted trees algorithm, and/or the like. A model parameter may include an attribute of a machine learning model that is learned from data input into the model (e.g., the training set 520). For example, for a regression algorithm, a model parameter may include a regression coefficient (e.g., a weight). For a decision tree algorithm, a model parameter may include a decision tree split location, as an example.

As shown by reference number 535, the machine learning system may use one or more hyperparameter sets 540 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 520. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), may be applied by setting one or more feature values to zero (e.g., for automatic feature selection), and/or the like. Example hyperparameters for a decision tree algorithm include a tree ensemble technique to be applied (e.g., bagging, boosting, a random forest algorithm, a boosted trees algorithm, and/or the like), a number of features to evaluate, a number of observations to use, a maximum depth of each decision tree (e.g., a number of branches permitted for the decision tree), a number of decision trees to include in a random forest algorithm, and/or the like.

To train a machine learning model, the machine learning system may identify a set of machine learning algorithms to be trained (e.g., based on operator input that identifies the one or more machine learning algorithms, based on random selection of a set of machine learning algorithms, and/or the like), and may train the set of machine learning algorithms (e.g., independently for each machine learning algorithm in the set) using the training set 520. The machine learning system may tune each machine learning algorithm using one or more hyperparameter sets 540 (e.g., based on operator input that identifies hyperparameter sets 540 to be used, based on randomly generating hyperparameter values, and/or the like). The machine learning system may train a particular machine learning model using a specific machine learning algorithm and a corresponding hyperparameter set 540. In some implementations, the machine learning system may train multiple machine learning models to generate a set of model parameters for each machine learning model, where each machine learning model corresponds to a different combination of a machine learning algorithm and a hyperparameter set 540 for that machine learning algorithm.

In some implementations, the machine learning system may perform cross-validation when training a machine learning model. Cross validation can be used to obtain a reliable estimate of machine learning model performance using only the training set 520, and without using the test set 525, such as by splitting the training set 520 into a number of groups (e.g., based on operator input that identifies the number of groups, based on randomly selecting a number of groups, and/or the like) and using those groups to estimate model performance. For example, using k-fold cross-validation, observations in the training set 520 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k–1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, a standard error across cross-validation scores, and/or the like.

In some implementations, the machine learning system may perform cross-validation when training a machine learning model by splitting the training set into a number of groups (e.g., based on operator input that identifies the number of groups, based on randomly selecting a number of groups, and/or the like). The machine learning system may perform multiple training procedures and may generate a cross-validation score for each training procedure. The machine learning system may generate an overall cross-validation score for each hyperparameter set 540 associated with a particular machine learning algorithm. The machine learning system may compare the overall cross-validation scores for different hyperparameter sets 540 associated with the particular machine learning algorithm, and may select the hyperparameter set 540 with the best (e.g., highest accuracy, lowest error, closest to a desired threshold, and/or the like) overall cross-validation score for training the machine learning model. The machine learning system may then train the machine learning model using the selected hyperparameter set 540, without cross-validation (e.g., using all of data in the training set 520 without any hold-out groups), to generate a single machine learning model for a particular machine learning algorithm. The machine learning system may then test this machine learning model using the test set 525 to generate a performance score, such as a mean squared error (e.g., for regression), a mean absolute error (e.g., for regression), an area under receiver operating characteristic curve (e.g., for classification), and/or the like. If the machine learning model performs adequately (e.g., with a performance score that satisfies a threshold), then the machine learning system may store that machine learning model as a trained machine learning model 545 to be used to analyze new observations, as described below in connection with FIG. 6.

In some implementations, the machine learning system may perform cross-validation, as described above, for multiple machine learning algorithms (e.g., independently), such as a regularized regression algorithm, different types of regularized regression algorithms, a decision tree algorithm, different types of decision tree algorithms, and/or the like. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 520 (e.g., without cross-validation), and may test each machine learning model using the test set 525 to generate a corresponding performance score for each machine learning model. The machine learning model may compare the performance scores for each machine learning model, and may select the machine learning model with the best (e.g., highest accuracy, lowest error, closest to a desired threshold, and/or the like) performance score as the trained machine learning model 545.

As indicated above, FIG. 5 is provided as an example. Other examples may differ from what is described in connection with FIG. 5. For example, the machine learning model may be trained using a different process than what is described in connection with FIG. 5. Additionally, or alternatively, the machine learning model may employ a different machine learning algorithm than what is described in connection with FIG. 5, such as a Bayesian estimation algorithm, a k-nearest neighbor algorithm, an a priori algorithm, a k-means algorithm, a support vector machine algorithm, a neural network algorithm (e.g., a convolutional neural network algorithm), a deep learning algorithm, and/or the like.

Figure 6:
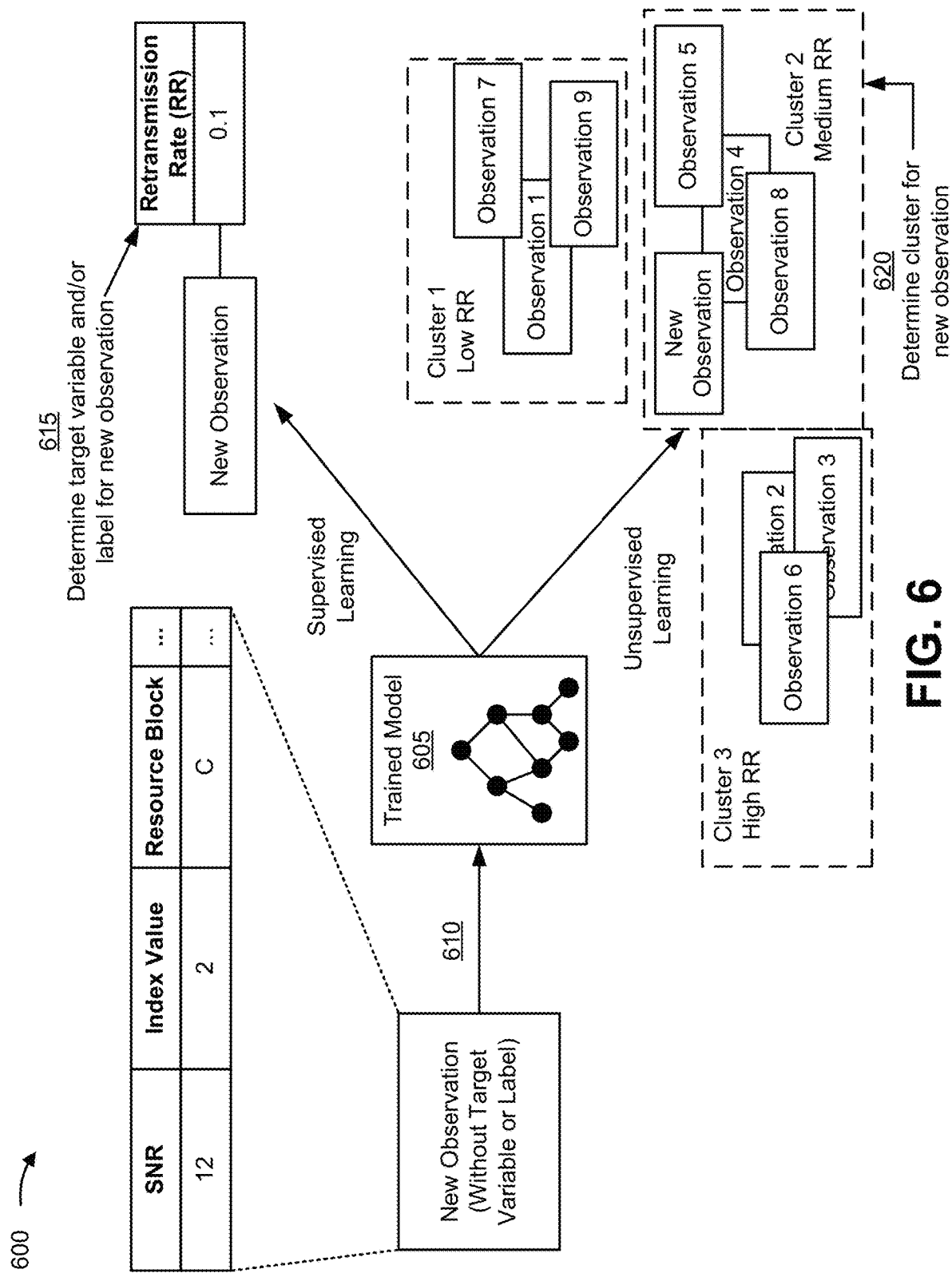
FIG. 6 is a diagram illustrating an example of applying a trained machine learning model to a new observation.

FIG. 6 is a diagram illustrating an example 600 of applying a trained machine learning model to a new observation. The new observation may be input to a machine learning system that stores a trained machine learning model 605. In some implementations, the trained machine learning model 605 may be the trained machine learning model 545 described above in connection with FIG. 5. The machine learning system may include a computing device, a server, a cloud computing environment, and/or the like, such as a RAN (e.g., RAN 210), a base station (e.g., base station 215), a core network (e.g., core network 220).

As shown by reference number 610, the machine learning system may receive a new observation (or a set of new observations), and may input the new observation to the machine learning model 605. As shown, the new observation may include a first feature of SNR, a second feature of index value, a third feature of resource block, and so on, as an example. The machine learning system may apply the trained machine learning model 605 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, a classification, and/or the like), such as when supervised learning is employed. Additionally, or alternatively, the output may include information that identifies a cluster to which the new observation belongs, information that indicates a degree of similarity between the new observations and one or more prior observations (e.g., which may have previously been new observations input to the machine learning model and/or observations used to train the machine learning model), and/or the like, such as when unsupervised learning is employed.

In some implementations, the trained machine learning model 605 may predict a value of 0.1 for the target variable of retransmission rate for the new observation, as shown by reference number 615. Based on this prediction (e.g., based on the value having a particular label/classification, based on the value satisfying or failing to satisfy a threshold, and/or the like), the machine learning system may provide a recommendation, such as map a given resource block (e.g., resource block C having an aggregate SNR of 12) to a given network slice (e.g., a network slice having an index value of 2), do not map the given network slice to the given resource block, and/or the like. Additionally, or alternatively, the machine learning system may perform an automated action and/or may cause an automated action to be performed (e.g., by instructing another device to perform the automated action), such as mapping the given resource block (e.g., resource block C having an aggregate SNR of 12) to the given network slice (e.g., a network slice having an index value of 2). As another example, if the machine learning system were to predict a value of 0.9 for the target variable of retransmission rate, then the machine learning system may provide a different recommendation (e.g., do not map the resource block to the network slice) and/or may perform or cause performance of a different automated action (e.g., map another resource block to the network slice). In some implementations, the recommendation and/or the automated action may be based on the target variable value having a particular label (e.g., classification, categorization, and/or the like), may be based on whether the target variable value satisfies one or more threshold (e.g., whether the target variable value is greater than a threshold, is less than a threshold, is equal to a threshold, falls within a range of threshold values, and/or the like), and/or the like.

In some implementations, the trained machine learning model 605 may classify (e.g. cluster) the new observation in a retransmission rate cluster, as shown by reference number 620. The observations within a cluster may have a threshold degree of similarity. Based on classifying the new observation in the retransmission rate cluster, the machine learning system may provide a recommendation, such as map one or more resource blocks from a group of resource blocks to a given network slice, do not map resource blocks in a given group of resource blocks to the given network slice, and/or the like. Additionally, or alternatively, the machine learning system may perform an automated action and/or may cause an automated action to be performed (e.g., by instructing another device to perform the automated action), such as mapping one or more resource blocks from one or more group of resource blocks to a given network slice.

In this way, the machine learning system may apply a rigorous and automated process to map resource blocks to network slices. The machine learning system enables recognition and/or identification of tens, hundreds, thousands, or millions of features and/or feature values for tens, hundreds, thousands, or millions of observations, thereby increasing an accuracy and consistency of mapping resource blocks to network slices relative to requiring computing resources to be allocated for tens, hundreds, or thousands of operators to manually map resource blocks to network slices using the features or feature values.

As indicated above, FIG. 6 is provided as an example. Other examples may differ from what is described in connection with FIG. 6.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
 determining, by a radio access network (RAN) node, an aggregate signal-to-noise ratio (SNR) of each resource block of a plurality of resource blocks,
  wherein the aggregate SNR of a given resource block of the plurality of resource blocks is based on SNRs of subcarrier frequencies of the given resource block;
 determining, by the RAN node, an index value of each network slice of a plurality of network slices; and
 mapping, by the RAN node, each resource block of the plurality of resource blocks to a network slice of the plurality of network slices,
  wherein the mapping is based on the aggregate SNR of each resource block of the plurality of resource blocks and on the index value of each network slice.

2. The method of claim 1, wherein determining the index value of each network slice of the plurality of network slices comprises determining, based on a type of network traffic on each network slice of the plurality of network slices, the index value of each network slice of the plurality of network slices.

3. The method of claim 2, wherein the type of network traffic on each network slice is a first critical level traffic or a second critical level traffic, and
 wherein a first index value of a first network slice for the first critical level traffic is lower than a second index value of a second network slice for the second critical level traffic.

4. The method of claim 2, wherein the type of network traffic on each network slice is a first priority traffic, a second priority traffic, or a third priority traffic, and
 wherein a first index value of a first network slice for the first priority traffic is lower than a second index value of a second network slice for the second priority traffic, and
 wherein the second index value of the second network slice is lower than a third index value of a third network slice for the third priority traffic.

5. The method of claim 2, further comprising:
 determining, by the RAN node, the type of network traffic on each network slice based on at least one of a type of user equipment associated with each network slice or internet protocol information of network traffic on each network slice.

6. The method of claim 1, further comprising:
 determining, by the RAN node, an updated aggregate SNR of each resource block of the plurality of resource blocks; and
 re-mapping, by the RAN node, each resource block of the plurality of resource blocks to another network slice of the plurality of network slices, based on the updated aggregate SNR of each resource block of the plurality of resource blocks.

7. The method of claim 1, further comprising:
 determining an updated aggregate SNR of each resource block; and
 re-mapping, based on the updated aggregate SNR of each resource block and on the index value of each network slice.

8. The method of claim 1, further comprising:
 arranging, based on the SNRs of subcarrier frequencies of each resource block, the subcarrier frequencies of each resource block.

9. A radio access network (RAN) node, comprising:
 one or more processors, configured to:
  determine a first aggregate signal-to-noise ratio (SNR) of a first resource block,
   wherein the first aggregate SNR of the first resource block is based on SNRs of subcarrier frequencies of the first resource block;
  determine a second aggregate SNR of a second resource block, wherein the second aggregate SNR of the second resource block is based on SNRs of subcarrier frequencies of the second resource block;
  determine a first index value of a first network slice, wherein the first index value is based on a type of network traffic on the first network slice;
  determine a second index value of a second network slice, wherein the second index value is based on a type of network traffic on the second network slice; and
  map, based on the first aggregate SNR being higher than the second aggregate SNR and based on the first index value being lower than the second index value, the first resource block to the first network slice and the second resource block to the second network slice.

10. The RAN node of claim 9, wherein the one or more processors are further configured to:
 determine a third aggregate SNR of a third resource block, wherein the third aggregate SNR of the third resource block is based on SNRs of subcarrier frequencies of the third resource block;
 determine a third index value of a third network slice, wherein the third index value is based on a type of network traffic on the third network slice; and
 map, based on the first aggregate SNR being higher than the third aggregate SNR, based on the third aggregate SNR being higher than the second aggregate SNR, based on the first index value being lower than the third index value, and based on the third index value being lower than the second index value, the third resource block to the third network slice.

11. The RAN node of claim 9, wherein the one or more processors are configured to, when determining the first aggregate SNR and determining the second aggregate SNR:
 determine the first aggregate SNR and the second aggregate SNR using at least one of a distributed unit or a radio unit.

12. The RAN node of claim 9, wherein the one or more processors are configured to, when mapping the first resource block to the first network slice and the second resource block to the second network slice:
 map the first resource block to the first network slice and the second resource block to the second network slice using at least one of a distributed unit, a central unit control plane, or a central unit user plane.

13. The RAN node of claim 9, wherein the one or more processors are further configured to:
  periodically determine an updated first aggregate SNR of the first resource block and an updated second aggregate SNR of the second resource block; and
  periodically re-map, based on the updated second aggregate SNR being higher than the updated first aggregate SNR, the second resource block to the first network slice and the first resource block to the second network slice.

14. The RAN node of claim 9, wherein the one or more processors are further configured to:
  arrange, based on the SNRs of the subcarrier frequencies of the first resource block and the SNRs of the subcarrier frequencies of the second resource block, the subcarrier frequencies in the first resource block and the second resource block.

15. The RAN node of claim 14, wherein the one or more processors are configured to, when arranging the subcarrier frequencies in the first resource block and the second resource block:
  arrange a first group of subcarrier frequencies having highest SNRs of the subcarrier frequencies of the first resource block; and
  arrange a second group of subcarrier frequencies having lowest SNRs of the subcarrier frequencies of the second resource block.

16. A non-transitory computer-readable medium storing instructions, the instructions comprising:
  one or more instructions that, when executed by one or more processors, cause the one or more processors to:
    determine an aggregate signal-to-noise ratio (SNR) of each resource block of a plurality of resource blocks,
      wherein the aggregate SNR of a given resource block of the plurality of resource blocks is based on SNRs of subcarrier frequencies of the given resource block, and
      wherein a first aggregate SNR of a first resource block of the plurality of resource blocks is higher than a second aggregate SNR of a second resource block of the plurality of resource blocks;
    determine, based on a type of network traffic on each network slice of a plurality of network slices, an index value of each network slice of the plurality of network slices,
      wherein a first index value of a first network slice of the plurality of network slices is lower than a second index value of a second network slice of the plurality of network slices; and
    map, based on the first aggregate SNR, the second aggregate SNR, the first index value, and the second index value, the first resource block to the first network slice and the second resource block to the second network slice.

17. The non-transitory computer-readable medium of claim 16, wherein the one or more instructions, that cause the one or more processors to map the first resource block to the first network slice and the second resource block to the second network slice, cause the one or more processors to:
  map the first resource block to the first network slice based on the first aggregate SNR being a highest aggregate SNR of aggregate SNRs of the plurality of resource blocks and the first index value being a lowest index value of index values of the plurality of network slices; and
  map the second resource block to the second network slice based on the second aggregate SNR being a lowest aggregate SNR of aggregate SNRs of the plurality of resource blocks and the second index value being a highest index value of index values of the plurality of network slices.

18. The non-transitory computer-readable medium of claim 16, wherein the one or more instructions, that cause the one or more processors to map the first resource block to the first network slice and the second resource block to the second network slice, cause the one or more processors to:
  map the first resource block to the first network slice and the second resource block to the second network slice using at least one of a distributed unit, a central unit control plane, or a central unit user plane.

19. The non-transitory computer-readable medium of claim 16, wherein the one or more instructions, when executed by the one or more processors, further cause the one or more processors to:
  periodically determine an updated first aggregate SNR of the first resource block and an updated second aggregate SNR of the second resource block; and
  periodically re-map, based on the updated second aggregate SNR being higher than the updated first aggregate SNR, the second resource block to the first network slice and the first resource block to the second network slice.

20. The non-transitory computer-readable medium of claim 16, wherein the one or more instructions, when executed by the one or more processors, further cause the one or more processors to:
  arrange a first group of subcarrier frequencies having highest SNRs of subcarrier frequencies of the first resource block of the plurality of resource blocks; and
  arrange a second group of subcarrier frequencies having lowest SNRs of subcarrier frequencies of the second resource block of the plurality of resource blocks.

* * * * *